United States Patent
Campbell et al.

(10) Patent No.: US 9,939,095 B2
(45) Date of Patent: Apr. 10, 2018

(54) TUBE FITTING

(71) Applicant: The Boeing Company, Chicago, IL (US)

(72) Inventors: Brent M. Campbell, Seattle, WA (US); David M. Griffith, Bellevue, WA (US); Ronald L. Clements, Kent, WA (US); Alexandra N. Sonnabend, Seattle, WA (US); Tammy L. McLeod, Renton, WA (US)

(73) Assignee: The Boeing Company, Chicago, IL (US)

( * ) Notice: Subject to any disclaimer, the term of this patent is extended or adjusted under 35 U.S.C. 154(b) by 963 days.

(21) Appl. No.: 14/167,139

(22) Filed: Jan. 29, 2014

(65) Prior Publication Data

US 2015/0211668 A1 Jul. 30, 2015

(51) Int. Cl.
*F16L 37/098* (2006.01)
*F16L 25/00* (2006.01)

(52) U.S. Cl.
CPC ......... *F16L 37/0985* (2013.01); *F16L 25/009* (2013.01); *F16L 2201/10* (2013.01); *Y10T 29/49826* (2015.01)

(58) Field of Classification Search
CPC ..... F16L 19/025; F16L 19/005; F16L 37/138; F16L 2201/10; F16L 25/009; Y10T 29/49826
USPC .................................. 285/305, 354, 374, 92
See application file for complete search history.

(56) References Cited

U.S. PATENT DOCUMENTS

| | | | |
|---|---|---|---|
| 1,069,916 A * | 8/1913 | Windsor | F16L 37/252 285/332.1 |
| 4,451,069 A | 5/1984 | Melone | |
| 4,781,400 A | 11/1988 | Cunningham | |
| 4,801,160 A * | 1/1989 | Barrington | F16L 19/0218 285/354 |
| 5,215,336 A * | 6/1993 | Worthing | F16L 19/005 285/319 |
| 5,226,682 A | 7/1993 | Marrison et al. | |
| 5,350,200 A | 9/1994 | Peterson et al. | |

(Continued)

FOREIGN PATENT DOCUMENTS

| | | |
|---|---|---|
| DE | 19516096 | 11/1996 |
| EP | 0728977 | 8/1996 |

(Continued)

OTHER PUBLICATIONS

International Search Report, International Application No. EP 15152782, dated May 11, 2015.

(Continued)

*Primary Examiner* — Gregory J Binda
*Assistant Examiner* — Zachary T Dragicevich
(74) *Attorney, Agent, or Firm* — Perman & Green, LLP (57) ABSTRACT

A tube fitting including a first fitting member having a cylindrical body including a flange, a second fitting member having a cylindrical body including a plurality of tines extending from the cylindrical body, the plurality of tines being configured to engage the flange where the plurality of tines and the flange are configured to secure the first and second fitting members to each other, and at least one seal disposed between the first fitting member and the second fitting member.

18 Claims, 6 Drawing Sheets

(56) References Cited

U.S. PATENT DOCUMENTS

| | | | |
|---|---|---|---|
| 5,388,866 A * | 2/1995 | Schlosser | F16L 19/005 285/319 |
| 5,553,895 A | 9/1996 | Karl et al. | |
| 5,725,259 A * | 3/1998 | Dials | F16L 19/0225 285/354 X |
| 5,752,726 A | 5/1998 | Fixemer | |
| 5,823,702 A | 10/1998 | Bynum | |
| 5,890,746 A | 4/1999 | Mueller | |
| 6,155,607 A * | 12/2000 | Hewitt | F16L 37/0985 285/322 |
| 6,302,447 B1 | 10/2001 | Lee | |
| 6,494,494 B2 | 12/2002 | Vogel et al. | |
| 6,517,119 B2 | 2/2003 | Thomas | |
| 6,916,988 B1 | 7/2005 | Auray et al. | |
| 7,000,953 B2 * | 2/2006 | Berghaus | F16L 19/0218 285/354 X |
| 7,681,925 B2 | 5/2010 | Lambert et al. | |
| 7,914,050 B2 | 3/2011 | Udhofer et al. | |
| 8,641,099 B2 | 2/2014 | Cuva et al. | |
| 8,777,931 B2 * | 7/2014 | Davis | A61M 39/10 285/332 |
| 2004/0056481 A1 * | 3/2004 | Do | F16L 19/005 285/92 |
| 2007/0052234 A1 | 3/2007 | Breay | |
| 2007/0164566 A1 * | 7/2007 | Patel | F16L 19/005 |
| 2014/0008908 A1 * | 1/2014 | Cuva | F16L 19/005 |

FOREIGN PATENT DOCUMENTS

| | | |
|---|---|---|
| EP | 1703191 | 9/2006 |
| EP | 2224155 | 9/2010 |
| WO | 0077434 | 12/2000 |
| WO | 2013162150 | 10/2013 |

OTHER PUBLICATIONS

McCorkle, D. "Fluid Coupling". Shur-Lok CorporationTechnical Sales Bulletin. (Sep. 25, 1998).

Parker Hannifin Corporation, Tube Fitting Division. "Parker's Universal Push-to-Connect (UPTC) Assembly". Columbus, OH, (Feb. 2008).

Shur-Lok Company. "Fluid Fittings: Flareless Tube End". 2012.

Eaton Aerospace Group. "Aeroquip Sure-Mate Couplings", Mar. 2013.

The Parker Fluid Connectors Group. "Parker Universal Push-to-Connect". Parker Hannifin Corporation, Aug. 2012 Bulletin 4017-1(UK).

The Oetiker Group. "Quick Connectors". www.oetiker.com, Jun. 2012.

Eaton Hydraulics. "Eaton STC Leak-Free Connectors". Http://www.eaton.com/Eaton/ProductsServices/Hydraulics/Connectors/PCT_256286. Copyrighted 2016.

* cited by examiner

TUBE FITTING

BACKGROUND

1. Field

The exemplary embodiments generally relate to tubing connections and, more particularly, to quick connect tubing connections.

2. Brief Description of Related Developments

Generally tubing connections, couplings or fittings include a male and a female connection member that are fastened together. In one example, the male and female connection member may be fastened together by threading the male connection member onto the female member to a predetermined torque using tools such as, for example, wrenches. In other examples, the tubing connection may be a quick-connect coupling where the male and female connection members may be pressed together (e.g. with or without tools) so that locking features of the male connection member engage corresponding locking features of the female connection member.

When assembling the male and female connection members mechanics may apply an improper torque (e.g. over or under torqued) to the tubing connection which may hinder the effectiveness of the connection. In addition there may be ergonomic effects of assembling the tubing connections due to, for example, high torque values for metal on metal seals. The threaded and quick connect tubing connections may not allow installation in hard-to-reach or limited space applications and may not provide an indication of when a proper connection is made leading to prolonged assembly times for coupling two pieces of tubing.

It would be advantageous to provide a quick connect tubing connection that addresses one or more of the aspects described above.

SUMMARY

In one aspect of the disclosed embodiment a tube fitting includes a first fitting member having a cylindrical body including a flange, a second fitting member having a cylindrical body including a plurality of tines extending from the cylindrical body, the plurality of tines being configured to engage the flange where the plurality of tines and the flange are configured to secure the first and second fitting members to each other, and at least one seal disposed between the first fitting member and the second fitting member.

In another aspect of the disclosed embodiment a tube fitting includes a first fitting member having a cylindrical body including a tubing engagement portion, a sealing portion and a flange, a second fitting member having a cylindrical body including a tubing engagement portion and a sealing portion, a third fitting member including a base portion and a plurality of tines extending from the base portion, the base portion being configured to fasten to the sealing portion of the second fitting member and the plurality of tines being configured to engage the flange where the plurality of tines and the flange are configured to secure the second and third fitting members to the first fitting member, and at least one seal disposed between the first fitting member and the second fitting member.

In yet another aspect of the disclosed embodiment a method for connecting tubing includes aligning a first tubing engagement member with a tube fitting assembly, the tube fitting having a second tubing engagement member and a coupling member affixed to the second tubing member, moving the first tubing engagement member and the fitting assembly together, and engaging a plurality of tines extending from the coupling member with a flange on the first tubing engagement member to maintain a seal formed between the first and second tubing engagement members.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 1:
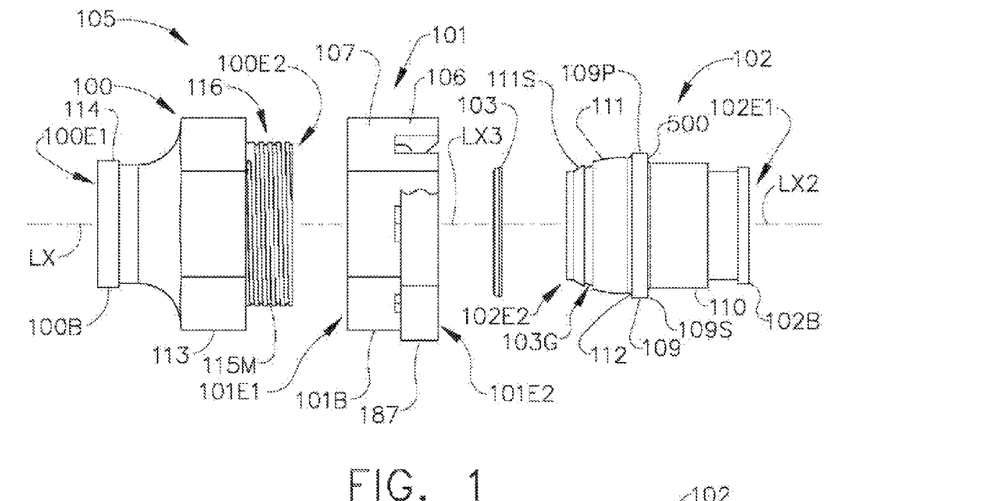
FIG. 1 is a schematic illustration of a tube fitting in accordance with aspects of the disclose embodiment.
Figure 2:
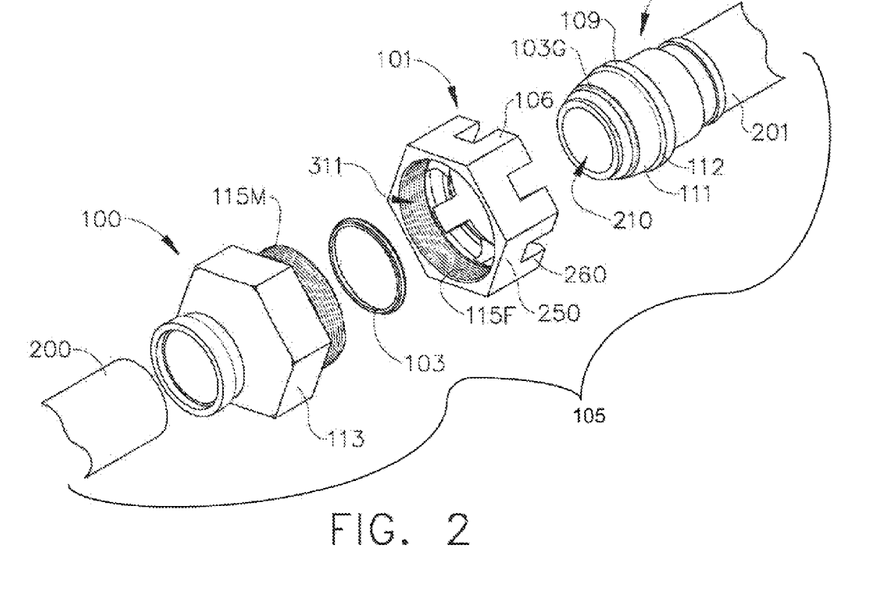
FIG. 2 is a schematic illustration of the tube fitting of FIG. 1 in accordance with aspects of the disclosed embodiment.
Figure 3:
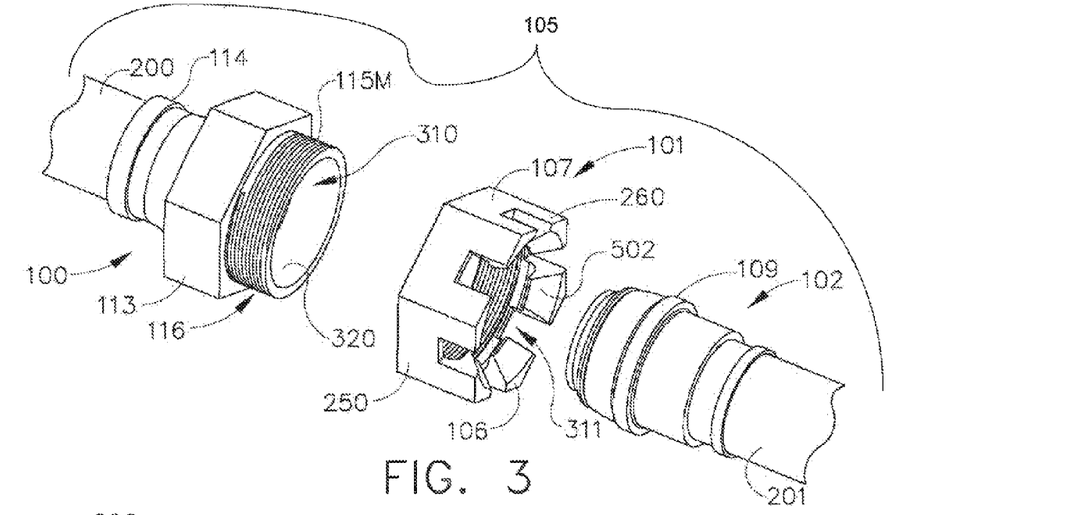
FIG. 3 is a schematic illustration of the tube fitting of FIG. 1 in accordance with aspects of the disclosed embodiment.
Figure 4:
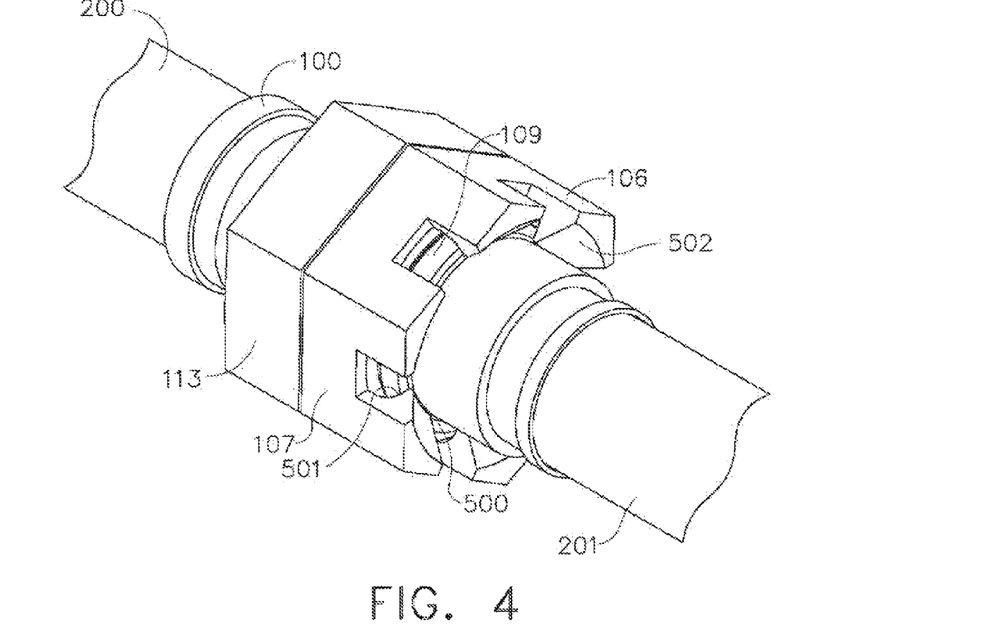
FIG. 4 is a schematic illustration of the tube fitting of FIG. 1 in accordance with aspects of the disclosed embodiment.

FIG. 1 is a schematic illustration of a tube fitting or coupling 105 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In one aspect the tube fitting 105 may be a quick-connect or easy-snap fitting where a quick-connect coupling/locking member or nut 101 (described below) and a second side fitting member or sleeve 102 (described below) may be pressed together so that locking features of the nut 101 engage corresponding locking features of the sleeve 102 for securing a seal formed by the tube fitting 105. In one aspect the tube fitting 105 may not need tools to install or otherwise connect the tube fitting 105 (e.g. provides a tool-less installation as will be described below) where standard tools are used to disconnect or otherwise uninstall a first side fitting member or union 100, the sleeve 102 and the nut 101. In other aspects any suitable tool, such as a compression tool, may be used to install or otherwise connect the tube fitting 105 (as will be described below). The tube fitting 105 may allow for reduced installation times, such as when compared to threaded compression fittings or other conventional fittings, while providing a re-connectable fitting that can be installed in, for example, any suitable aircraft 900 (FIG. 9) or other vehicle that includes tube connectors for hydraulic, pneumatic or other suitable fluidic systems. In one aspect the tube fitting 105 may be provided for installation on existing tubing where one or more of the union 100, sleeve 102 and nut 101 may be coupled to or otherwise installed on any existing tubing in any suitable manner, such as by crimping, swaging, soldering, welding, etc. In other aspects the tube fitting 105 may be preinstalled on tubing where the tubing/fitting assembly is installed as a unit within, for example, the aircraft 900. As will also be described in greater detail below the tube fitting may include one or more elastomeric seals and have a configuration that provides for positive low force seals (e.g. seals configured to allow easy coupling of the tube fitting while providing sealing for predetermined system pressures).

Referring also to FIGS. 2-6 in one aspect the tube fitting 105 includes a first side fitting member or union 100, a second side fitting member or sleeve 102 and a quick-connect coupling/locking member or nut 101. The union 100, sleeve 102 and nut 101 may be constructed of any suitable metal, plastic, composite or any other suitable material.

The union 100 includes a generally cylindrical body 100B having an internal passage 310 extending along a longitudinal axis or centerline LX of the body 100B. The union 100 may also include a tubing engagement portion 114, one or more flats 113, and a seal portion 116 longitudinally arranged or spaced along the body 100B. The internal passage 310 may extend through the body 100B for allowing fluid to pass through the union 100. The tubing engagement portion 114 may be disposed at a first end 100E1 of the union 100 and be configured for coupling the union 100 to any suitable tubing 200. In one aspect the tubing engagement portion 114 may be configured such that the tubing 200 is inserted into the internal passage 310 or butted up against the tubing engagement portion 114 where the tubing engagement portion 114 is secured to the tubing 200 in any suitable manner substantially similar to that described above. In other aspects the tubing 200 may be secured to the union 100 in any suitable manner. The one or more flats 113 may be disposed at any suitable position along the longitudinal axis of the body 100B and include any suitable flats or surfaces configured to allow any suitable tool, such as a wrench or other suitable tool, to engage the union 100 for connecting or disconnecting one or more of the union 100, sleeve 102 and nut 101 as will be described below. The seal portion 116 may be disposed at a second end 100E2 of the union 100 and include one or more fastening members or features 115M configured to engage corresponding fastening members or features 115F of the nut 101 as will be described below. In one aspect the fastening members 115M, 115F may include a threaded portion having one or more threads with any suitable pitch for coupling the union 100 and the nut 101. In still other aspects fastening members 115M, 115F may be any suitable fastening members such as snaps, pins, clips, etc. As can be seen best in FIG. 3, the seal portion 116 may include seal surface 320 formed in a wall of the internal passage 310. The seal surface 320 may be a conical surface having any suitable angle θ. In one aspect the seal surface 320 may form a conical surface having an angle θ of about 24° while in other aspects the angle θ may be more or less than about 24°. In other aspects the seal surface 320 may have any suitable shape and or configuration such as an acorn shaped surface or parabolic surface or a compound surface having any suitable number of angled surface(s). The seal portion 116 may also include a second surface 330 (FIG. 5) disposed between the first end 100E1 and the seal surface 320. In one aspect the second surface 330 may be a stop surface against which the sleeve 102 abuts when the tube fitting 105 is assembled. In other aspects, there may be any suitable clearance provided between the sleeve 102 and the second surface 330 when the tube fitting is assembled.

In one aspect the sleeve 102 includes a generally cylindrical body 102B having an internal passage 210 extending along a longitudinal axis or centerline LX2 of the body 102B. The sleeve 102 may also include a tubing engagement portion 110, a flange 109 and a seal portion 111 longitudinally arranged or spaced along the body 102B. The internal passage 210 may extend through the body 102B for allowing fluid to pass through the sleeve 102. The tubing engagement portion 110 may be located at a first end 102E1 of the sleeve 102 and may be substantially similar to tubing engagement portion 114 of the union 100 for securing the sleeve 102 to any suitable tubing 201 in any suitable manner such as described above. The flange 109 may extend radially from a peripheral surface of the tubing engagement portion 110 and include a peripheral surface 109P and an engagement surface 500 configured to engage the nut 101, as will be described below. The seal portion 111 may be disposed at a second end 102E2 of the sleeve 102 and at least a portion of the seal portion 111 may form a sealing surface 111S. In one aspect the sealing surface 111S may be a conical sealing surface where the conical angle corresponds to the conical angle θ of the seal surface 320 of the union 100 for allowing sealing engagement between the union 100 and sleeve 102. In one aspect the angle θ may allow for positive low force seals. In other aspects the angle of the seal surface 320 and the angle of the sealing surface 111S may be different. In still other aspects the sealing surface 111S of the seal portion 111 may have any suitable shape and or configuration such as an acorn shaped surface, parabolic surface or a compound surface having any suitable number of angled surfaces.

At least one elastomeric member or seal member 103 having any suitable shape and/or configuration, may be placed over or otherwise affixed to the sealing surface 111S of seal portion 111 such that when seal portion 111 is inserted into the union 100 the at least one elastomeric member 103 engages both the seal surface 320 and the sealing surface 111S of seal portion 111 to form a tube fitting seal. In one aspect the seal portion 111 may include a groove or slot 103G in which the at least one elastomeric member 103 may be at least partially inserted and longitudinally retained. In other aspects the at least one seal may engage the seal portion 111 in any suitable manner such that the at least one elastomeric member 103 is longitudinally retained relative to the seal portion 111 in any suitable manner. In one aspect the at least one elastomeric member 103 may be a single seal or member such as an o-ring seal or any other seal having any suitable cross section. In still other aspects more than one elastomeric member may be provided at any suitable interface between, for example, the union 100 and the sleeve 102. In one aspect the fitting seal (e.g. formed by the at least one elastomeric member 103) may be configured to substantially prevent fluids from escaping (e.g. hold a system pressure or partial system pressure of the fluidic system in which the tube fitting is installed) the assembled or otherwise coupled tube fitting 105. In another aspect the at least one elastomeric member 103 and groove 103G may not be provided such that the fitting seal is formed by, for example, substantially direct contact between at least a portion of the sealing surface 111S of the seal portion 111 and the seal surface 320. In still other aspects the tube fitting seal may be formed with both the elastomeric member 103 and substantial contact or near contact between the sealing surface 111S and the seal surface 320 (e.g. where substantial or near contact refers to a spatial relationship between the sealing surface 111S and the seal surface 320 where some clearance or gap may be provided between the sealing surface 111S and the seal surface 320 so that the clearance or gap between the sealing surface 111S and the seal surface 320 holds at least partial system pressure).

The nut 101 includes a generally cylindrical body 101B having an internal passage 311 extending along a longitudinal axis or centerline LX3 of the body 101B. The body 101B may include an external surface having one or more flats 107 which may be substantially similar to the one or more flats 113 of the union 100 so that any suitable tool, such as a wrench, can engage the one or more flats 107 for providing relative rotation between, for example, the nut 101 and the union 100. The body 101B may also include a first end 101E1 and a second end 101E2 longitudinally spaced from one another. In one aspect the body 101B may include a base portion 250 adjacent the first end 101E1 and a tine portion 260 adjacent the second end 101E2 through which the internal passage 311 extends. At least a portion of the internal passage 311, for example the portion of the internal passage 311 corresponding to the base portion 250, may include any suitable fastening members 115F (described above) configured to engage the fastening members 115M of the union 100. The internal passage 311 may also be configured to allow the sleeve 102 to be at least partially inserted into the internal passage 311, or in other words to allow the nut 101 to slide over at least a portion of the sleeve 102 so that the sleeve 102 is located at least partially within the internal passage 311.

In one aspect, the tine portion 260 of the nut 101 includes a plurality of tines 106 extending from the base portion 250 of the body 101B. Each tine 106 may be integrally formed as a unitary one piece member with the body 101B and extend away from the body 101B so as to be cantilevered from the base portion 250 of the body 101B. As can be seen in the Figs. the flats 107 may extend along the tine portion 260 while in other aspects the flats 107 may be included only on the base portion 250 or only on the tine portion 260. Here each of the tines may be considered as having a proximate end (e.g. closest to the base portion 250) and a distal end (e.g. furthest from the base portion 250). Each tine 106 may include an inwardly facing (e.g. generally facing towards the centerline LX3 of the body 101B) shoulder 550 adjacent the distal end. The inwardly facing shoulder 550 may have an angled surface or engagement ramp 502 and an opposing second angled or retaining surface 501. In one aspect the engagement ramp 502 may have any suitable angle (e.g. relative to the longitudinal axes LX3 or centerline CL of the tube fitting 105) that allows the tines 106 to pass over the flange 109 when one or more of the sleeve 102 and the nut 101 is moved towards the other one of the sleeve 102 and the nut 101. In one aspect the flange 109 may include a ramp surface 112 having any suitable shape and/or slope configured to interface with the engagement ramp 502 to at least partially allow the tines 106 to pass over the flange 109 for assembly of the tube fitting 105. The retaining surface 501 may be configured to interface with the engagement surface 500 for securing the nut 101 (and the union 100) to the sleeve 102. In one aspect the retaining surface 501 and the engagement surface 500 may have any suitable angle(s) relative to their respective longitudinal axes LX2, LX3 (or a centerline CL of the assembled tube fitting 105) so that the coupling formed by engagement of the tines 106 with the flange 109 may sustain any suitable loads produced by any suitable fluidic system, such as for example a fluidic system having a system pressure of about 5000 psi. In one aspect the engagement between the tines 106 of the nut 101 and the flange 109 of the sleeve 102 may be configured so that the nut 101 may rotate about the longitudinal axes LX2, LX3 to allow de-coupling of the tube fitting 105 as will be described below.

Figure 8:
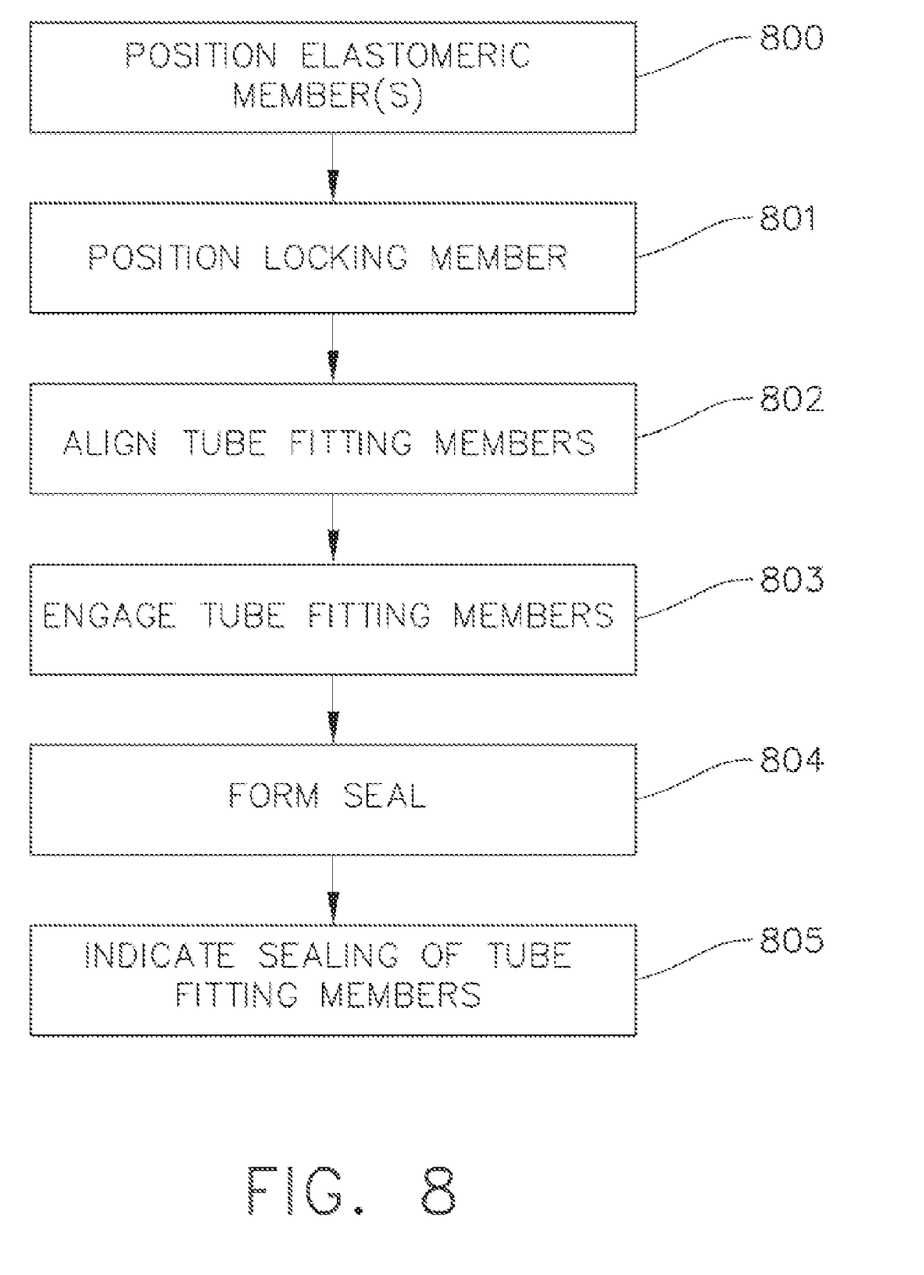
FIG. 8 is a flow diagram in accordance with aspects of the disclosed embodiment.

Referring now to FIGS. 1, 3, 5 and 6 an exemplary assembly of the tube fitting 105 will be described in accordance with an aspect of the disclosed embodiment. In one aspect the union 100 may be affixed to a first side tubing 200 and the sleeve 102 may be affixed to a second side tubing 201 in any suitable manner, such as described above. The elastomeric member 103 may be placed on the seal portion 111, such as in groove 103G in any suitable manner (FIG. 8, Block 800). For example, the elastomeric member 103 may be pressed into groove 103G. The nut 101 may be positioned on (e.g. fastened to) the union 100 such as by, for example, threading the nut 101 onto the union 100 (e.g. engagement of the fastening members 115M, 115F) (FIG. 8, Block 801). In one aspect, initial tightening of the nut 101 onto the union 100 may be performed with any suitable jig or gauge so that the retaining surface 501 of each tine 106 is located a predetermined distance D from any suitable datum DP of the union 100. In one aspect the datum DP may be a point on the seal surface 320 where a seal is formed between the seal surface 320 and the elastomeric member 103 (and/or the sealing surface 111S of the seal portion 111). In other aspects the datum DP may be any suitable point or feature of the union 100 from which the position of the retaining surface 501 can be set to form a seal in the tube fitting 105 when the tube fitting 105 is assembled.

Figure 9:
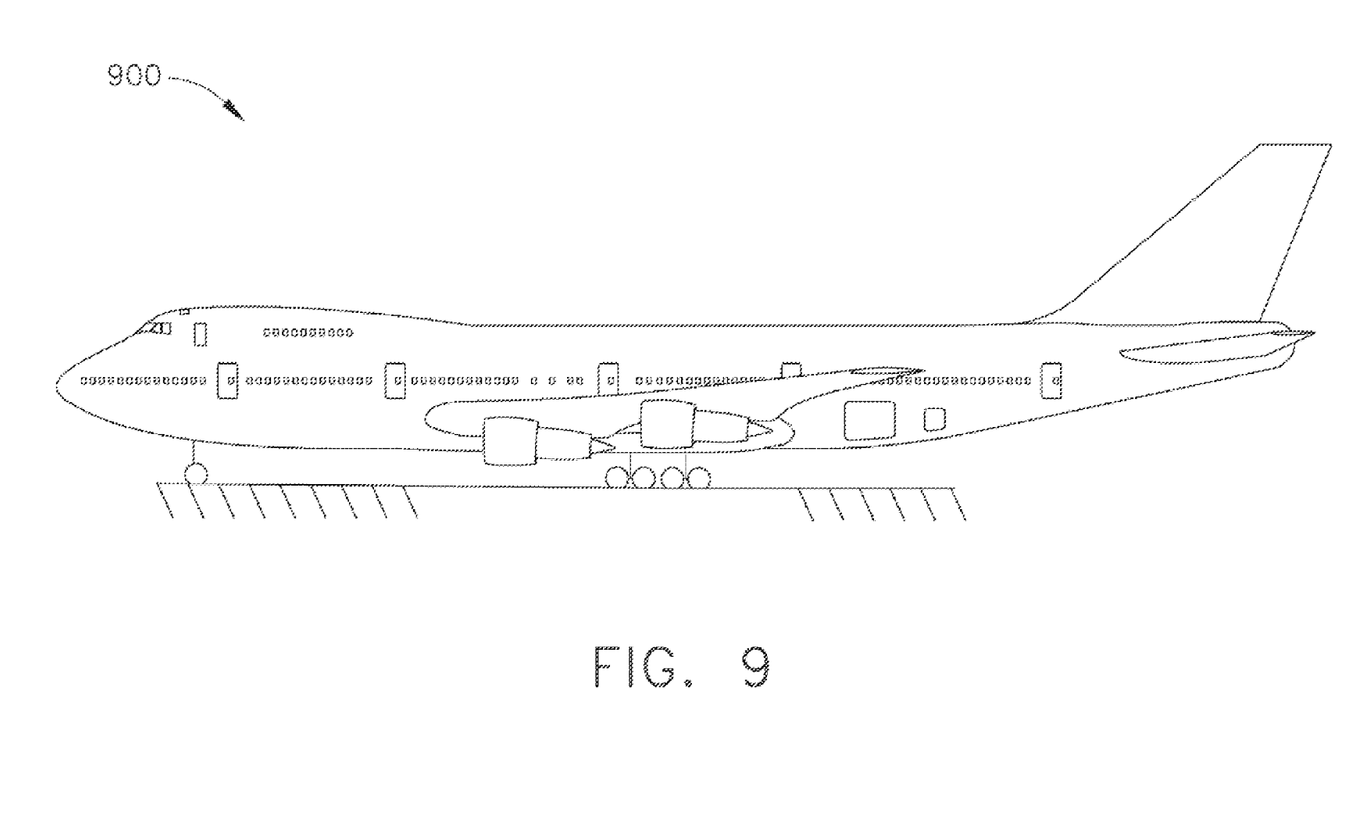
FIG. 9 is a schematic illustration of an aircraft incorporating features of the disclosed embodiment.

In one aspect the threading of the nut 101 onto the union 100 (e.g. assembly of the nut and union to form a union assembly 600) and assembly of the elastomeric member 103 onto the sleeve 102 (to form a sleeve assembly 601) may be performed in preassembly, such as before the tube fitting 105 is provided for installation in, for example, aircraft 900 or any other suitable vehicle or fluidic system application. For example, in one aspect the union assembly 600 may be provided on the first side tubing 200 while the sleeve assembly 601 may be provided on the second side tubing 201. In another aspect, the union assembly 600 may be provided without the first side tubing 200 and the sleeve assembly 601 may be provided without the second side tubing 201 (e.g. where the two assemblies are affixed to the respective first and second side tubing at any suitable time). In still other aspects there may not be a preassembly of the nut 101 and union 100 and/or a preassembly of the elastomeric member 103 and sleeve 102. In yet another aspect the union 100, nut 101, sleeve 102 and elastomeric member 103 may be assembled in any suitable order or sequence.

Figure 5:
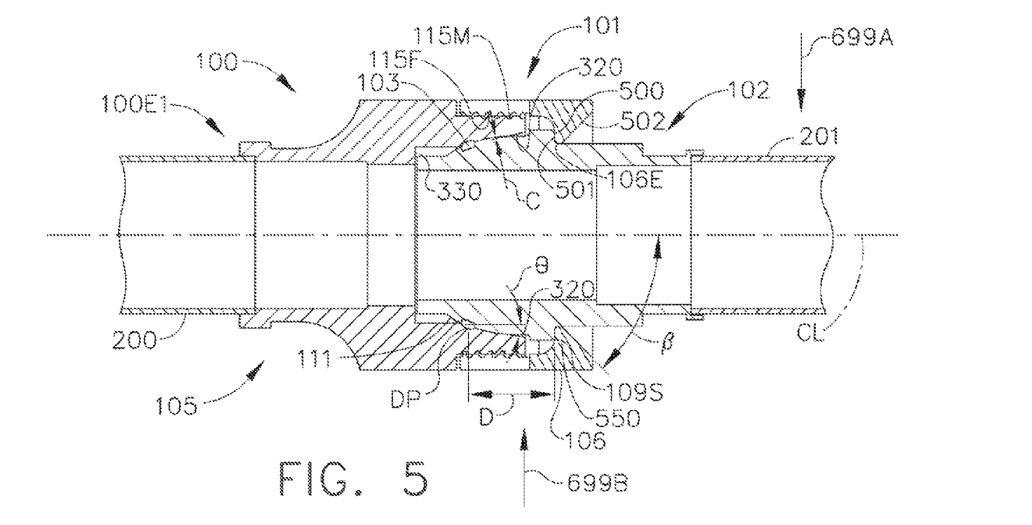
FIG. 5 is a schematic sectional view of the tube fitting of FIG. 1 in accordance with aspects of the disclosed embodiment.
Figure 6:
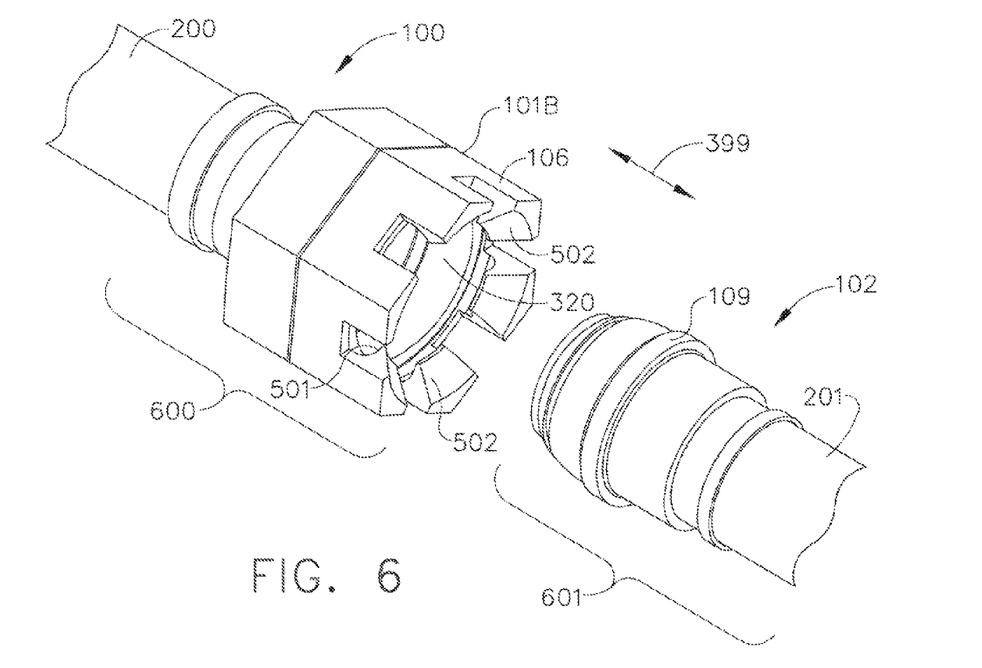
FIG. 6 is a schematic illustration of the tube fitting of FIG. 1 in accordance with aspects of the disclosed embodiment.
Figure 7:
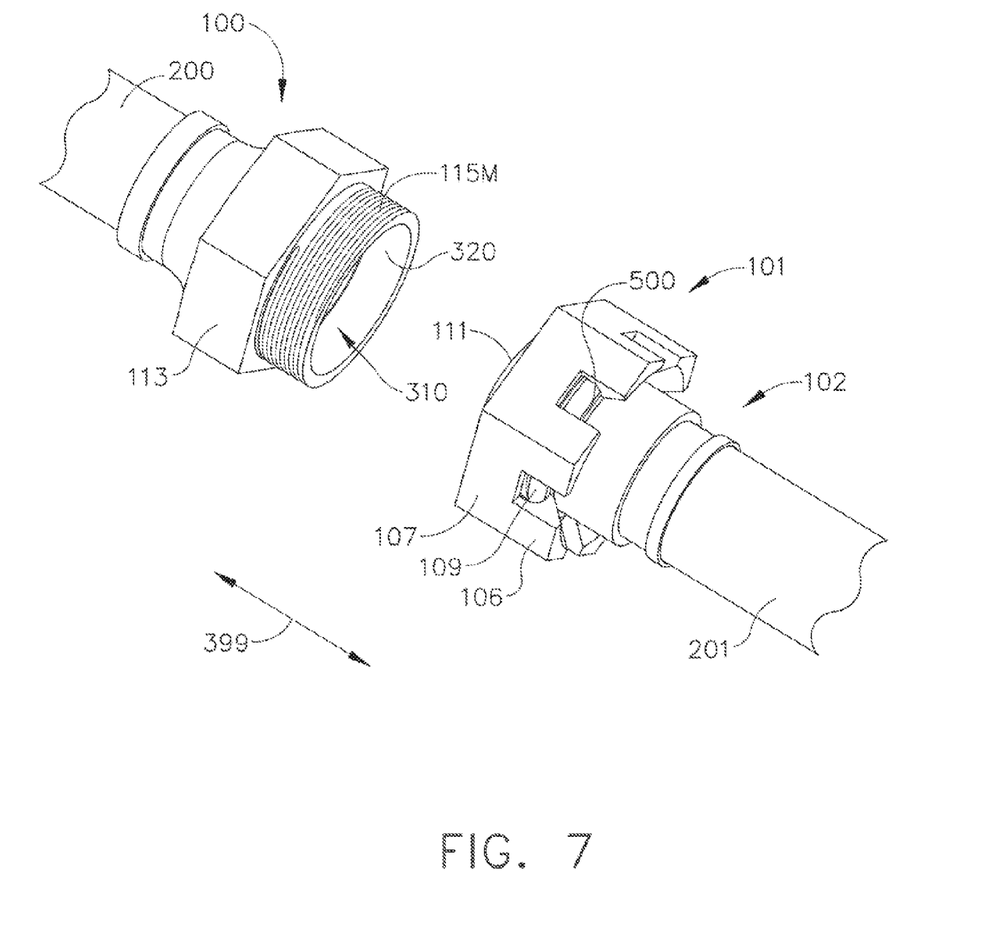
FIG. 7 is a schematic illustration of the tube fitting of FIG. 1 in accordance with aspects of the disclosed embodiment.

The longitudinal axis or centerline LX2 (FIG. 1) of the sleeve 102 (e.g. the sleeve assembly 601) may be generally aligned with the longitudinal axis or centerline LX (FIG. 1) of the union 100 (e.g. the union assembly 600) (FIG. 8, Block 802). As may be realized, when the union 100, sleeve 102 and nut 101 are assembled their axes LX, LX3, LX2 (respectively) are substantially in-line with a centerline CL of the tube fitting 105 (FIG. 5).

The aligned union assembly 600 and sleeve assembly 601 may be engaged for assembly in any suitable manner (FIG. 8, Block 803). For example, where the elastomeric member 103 is provided an operator may move (by hand and without tools, e.g. a tool-less assembly) the union assembly 600 and the sleeve assembly 601 towards each other in the longitudinal direction 399 so that the sleeve assembly 601 is at least partially inserted into the internal passage 311. In other aspects one of the union assembly 600 and the sleeve assembly 601 may be moved towards the other one of the union assembly 600 and the sleeve assembly 601 so that the sleeve assembly 601 is at least partially inserted into the internal passage 311. The union assembly 600 and the sleeve assembly 601 may continue to move towards each other so that the tines 106 pass over the flange 109, the elastomeric member 103 engages the seal surface 320 and is compressed to form the tube fitting seal (FIG. 8, Block 804) and the retaining surface 501 engages the engagement surface 500. As may be realized, the tines 106 and flange 109 may form quick-connect features that allow coupling of tube fitting 105. In one aspect when the tube fitting 105 is assembled clearances C may be provided between the sealing surface 111S of the seal portion 111 and the seal surface 320 (FIG. 5) and may be configured to maintain at least partial system pressure within an internal passage of the tube fitting 105 while providing a visual indication (a predetermined amount of fluid bypassing the partial system pressure seal) that, for example, the elastomeric member 103 and or tube fitting 105 may be ready for replacement and/or repair.

Where the elastomeric member 103 and groove 103G are not provided the operator may move (e.g. using any suitable compression tool) the union assembly 600 and the sleeve assembly 601 towards each other in the longitudinal direction 399 so that the sleeve assembly 601 is at least partially inserted into the internal passage 311. In other aspects one of the union assembly 600 and the sleeve assembly 601 may be moved towards the other one of the union assembly 600 and the sleeve assembly 601 so that the sleeve assembly 601 is at least partially inserted into the internal passage 311. The union assembly 600 and the sleeve assembly 601 may continue to move towards each other so that the tines 106 pass over the flange 109, the sealing surface 111S of seal portion 111 substantially contacts and engages the seal surface 320 to form the tube fitting seal (FIG. 8, Block 804) and the retaining surface 501 engages the engagement surface 500.

As described above, each of the tines 106 includes an engagement ramp or angled surface 502 that engages and slides over the ramp surface 112 of the flange 109. As may be realized, the cantilevered tines 106 may form resilient members that provide a respective radially inward force (e.g. in the direction of arrows 699A, 699B—FIG. 5) that resists movement (e.g. in the longitudinal direction 399) between the union assembly 600 and the sleeve assembly 601 when the two assemblies are coupled. As may also be realized the tines 106 may flex radially outward, e.g. to provide the resistive force, as the engagement ramp 502 of the tine 106 slides over the ramp surface 112 of the flange 109. The angle β of the engagement ramps 502 and the contour of the ramp surface 112 may be provided so that the resistive force provided by the tines 106 is overcome by a predetermined amount of longitudinal engagement force applied to the union assembly 600 relative to the sleeve assembly 601.

The interaction between the tines 106 and the flange 109 may also provide a positive latching system that determines or otherwise provides an indication of when a proper seal is made such as by the compression of the elastomeric member 103, and/or the interaction between the sealing surface 111S of seal portion 111 and seal surface 320 (FIG. 8, Block 805). For example, the engagement of the tines 106 with the flange 109 may provide one or more of a tactile, aural and visual indication of when the tube fitting 105 is fully assembled and the proper seal is made. In one aspect as a tip 106E of the shoulder 550 of each tine 106 rides along a peripheral surface 109P (FIG. 1) of the flange 109 and passes a shoulder 109S (e.g. that defines a transition between the peripheral surface 109P and the engagement surface 500—FIGS. 1 and 5) an aural sound (e.g. such as a snap) may be produced as the tines 106 move past the shoulder 109S indicating that the union assembly 600 has been moved a predetermined amount in the longitudinal direction 399 relative to the sleeve assembly 601 to effect sealing of the tube fitting 105. In another aspect the passing of the tines 106 past the shoulder 109S may provide a mechanical vibration in the fitting that can be felt by, for example, a mechanic/operator touching or otherwise holding the fitting members 100, 101, 102 either directly or with a tool. In still another aspect, the tines 106 and shoulder 109S (and/or engagement surface 500) may provide a visual indication of when the union assembly 600 has been moved a predetermined amount in the longitudinal direction 399 relative to the sleeve assembly 601 to effect sealing of the tube fitting 105. For example, the visual indication may be provided when the retaining surface 501 of the tines 106 is visually substantially seated against the engagement surface 500 of the flange 109. In one aspect any suitable retainer or ring 187 (partially illustrated in FIG. 1) may be provided over the tines 106 to substantially prevent the tines 106 from spreading or flexing beyond a predetermined amount. The retainer 187 may include flats and extend over any suitable longitudinal length of the nut 101. The retainer 187 may be secured or otherwise affixed to the nut 101 in any suitable manner such as by detents, snaps, pins, etc. As may be realized, the retainer 187 may be placed over the tines 106 and/or base portion 250 after the tines 106 engage the flange 109 (e.g. the retainer 187 may be positioned so that one or more of the sleeve 102 and tubing 201 are disposed at least partly within an internal passage of the retainer 187 during engagement of the tines 106 with the flange 109 and then placed over the tines 106 after engagement). In other aspects the retainer 187 may be placed over the tines at any suitable point during assembly of the tube fitting 105.

Disassembly of the tube fitting 105 may be performed by removing the retainer 187 from the tines (if the retainer is provided) and unthreading the nut 101 from the union 100 using, for example, wrenches applied to the respective flats 107, 113 of the nut 101 and union 100. Here the nut 101 is free to rotate about the longitudinal axis LX2 of the sleeve 102 so that the fastening members 115M, 115F may be disengaged for disassembling the tube fitting. Here when the fastening members 115M, 115F are fully disengaged the tubing 200, 201 can be separated for any suitable purpose such as inspection and/or repair. In this aspect, the tubing 200 will have the union 100 affixed thereto and the tubing 201 will have the sleeve assembly 601 and nut 101 attached thereto, where the nut 101 is freely rotatable on the sleeve 102. As may be realized, subsequent re-connection or assembly of the tube fitting 105 may be performed by threading the nut 101 onto the union 100 until, for example, a predetermined torque is applied to the nut 101 (e.g. relative to the union 100) for forming the tube fitting seal.

As can be seen from the above description, the tube fitting 105 in accordance with the aspects of the disclosed embodiment provides in one aspect a metal (or other suitable material) on elastomeric material seal and in another aspect a metal (or other suitable material) on metal (or other suitable material) seal. In one aspect, the tube fitting 105 may also provide for a tool-less assembly of the tube fitting 105 by hand (e.g. such as when an elastomeric member 103 is provided) or in another aspect assembly of the tube fitting 105 with a compression tool (e.g. where the elastomeric member 103 is not provided). The tube fitting 105 may provide multiple sealing points and/or includes a positive latching system that determines when a proper tube fitting seal is made. The configuration of the tube fitting 105 as described above allows for assembly of the tube fitting 105 so that the sealing of the tube fitting may be performed in less than about 5 seconds. In other aspects the sealing of the tube fitting may be performed in more or less than about 5 seconds. The longitudinal force for assembling the tube fitting 105 may be low allowing for a tool-less installation of the tube fitting 105. The assembly of the tube fitting 105 as described herein may substantially eliminate a need to look up predetermined fitting torque values and prevent over tightening of the tube fitting for the initial installation of the tube fitting 105. The elastomeric member 103 may compensate for fluctuation in the sealing surfaces of the union 100 and sleeve 102. The sealing surfaces of the tube fitting 105 can also be repaired by replacing the elastomeric member 103.

In accordance with one or more aspects of the disclosed embodiment a tube fitting includes a first fitting member having a cylindrical body including a flange; a second fitting member having a cylindrical body including a plurality of tines extending from the cylindrical body, the plurality of tines being configured to engage the flange where the plurality of tines and the flange are configured to secure the first and second fitting members to each other; and at least one seal disposed between the first fitting member and the second fitting member.

In accordance with one or more aspects of the disclosed embodiment the second fitting member includes a tube engagement member having a tubing engagement portion and a sealing portion, and a coupling member removably fastened to the sealing portion, where the plurality of tines extend from the coupling member.

In accordance with one or more aspects of the disclosed embodiment the tube engagement member and the coupling member are configured to detach to disassemble the tube fitting such that the coupling member remains affixed to the first fitting member.

In accordance with one or more aspects of the disclosed embodiment the coupling member is rotatable relative to the first fitting member.

In accordance with one or more aspects of the disclosed embodiment each of the tube engagement member and the coupling member include flats configured to interface with a tool for disassembly of the tube fitting.

In accordance with one or more aspects of the disclosed embodiment the tube engagement member includes an internal passage having a sealing surface, the first fitting member includes a mating sealing surface, and the at least one seal is disposed between the sealing surface and the mating sealing surface.

In accordance with one or more aspects of the disclosed embodiment the at least one seal includes one or more of an elastomeric seal or a seal formed by interfacing of the sealing surface and the mating sealing surface.

In accordance with one or more aspects of the disclosed embodiment the second fitting member includes an internal passage formed therethrough, and the first fitting member includes a cylindrical body having an internal passage and being configured to be at least partially inserted into the internal passage of the second fitting member.

In accordance with one or more aspects of the disclosed embodiment engagement of the plurality of tines with the flange is configured to produce one or more of a tactile, aural and visual indication that a predetermined compressive force is applied to the at least one seal.

In accordance with one or more aspects of the disclosed embodiment the flange includes a ramp surface and an engagement surface; and each of the plurality of tines has an engagement ramp and a retaining surface; where the ramp surface and the engagement ramp interface for assembly of the tube fitting and the engagement surface and the retaining surface interface to maintain a compressive force on the at least one seal.

In accordance with one or more aspects of the disclosed embodiment the engagement surface and the retaining surface are configured such that a portion of the second fitting member including the plurality of tines remains attached to the first fitting member upon disassembly of the tube fitting.

In accordance with one or more aspects of the disclosed embodiment the at least one seal is configured to maintain at least partial system pressure within an internal passage of the tube fitting.

In accordance with one or more aspects of the disclosed embodiment a tube fitting includes a first fitting member having a cylindrical body including a tubing engagement portion, a sealing portion and a flange; a second fitting member having a cylindrical body including a tubing engagement portion and a sealing portion; a third fitting member including a base portion and a plurality of tines extending from the base portion, the base portion being configured to fasten to the sealing portion of the second fitting member and the plurality of tines being configured to engage the flange where the plurality of tines and the flange are configured to secure the second and third fitting members to the first fitting member; and at least one seal disposed between the first fitting member and the second fitting member.

In accordance with one or more aspects of the disclosed embodiment the second and third fitting members are unfastened to disassemble the tube fitting such that the third fitting member remains affixed to the first fitting member.

In accordance with one or more aspects of the disclosed embodiment the third fitting member is rotatable relative to the first fitting member.

In accordance with one or more aspects of the disclosed embodiment the at least one seal includes one or more of an elastomeric seal or a seal formed by interfacing of the sealing surface and the mating sealing surface.

In accordance with one or more aspects of the disclosed embodiment engagement of the plurality of tines with the flange is configured to produce one or more of a tactile, aural and visual indication that a predetermined compressive force is applied to the at least one seal.

In accordance with one or more aspects of the disclosed embodiment a method for connecting tubing includes aligning a first tubing engagement member with a tube fitting assembly, the tube fitting assembly having a second tubing engagement member and a coupling member affixed to the second tubing engagement member; moving the first tubing engagement member and the tube fitting assembly together; and engaging a plurality of tines extending from the coupling member with a flange on the first tubing engagement member to maintain a seal formed between the first and second tubing engagement members.

In accordance with one or more aspects of the disclosed embodiment the method further includes providing, with at least the plurality of tines, one or more of a tactile, aural and visual indication that a predetermined compressive force is applied to the seal upon engagement of the plurality of tines with the flange.

In accordance with one or more aspects of the disclosed embodiment the tube fitting assembly is disassembled by detaching the coupling member from the second tubing engagement member such that the coupling member remains affixed to the first tubing engagement member upon disassembly of the tube fitting assembly.

In accordance with one or more aspects of the disclosed embodiment a tube coupling includes a first tubing engagement portion; a threaded portion; and a quick-connect portion, where the threaded portion is disposed between the tubing engagement portion and the quick connect portion.

In accordance with one or more aspects of the disclosed embodiment the threaded portion is configured to couple the tubing engagement portion and the quick-connect portion.

In accordance with one or more aspects of the disclosed embodiment the tube coupling further includes a second tubing engagement portion having a sealing surface, wherein the first tubing engagement portion includes an internal passage having a sealing surface configured to form a seal with the sealing surface of the second tubing engagement portion.

In accordance with one or more aspects of the disclosed embodiment an elastomeric member is disposed between the sealing surfaces of the first tubing engagement portion and the second tubing engagement portion.

In accordance with one or more aspects of the disclosed embodiment the quick-connect portion includes a plurality of tines extending therefrom and the second tubing engagement portion includes a flange where the tines are configured to engage the flange for coupling the quick-connect portion to the second tubing engagement portion.

In accordance with one or more aspects of the disclosed embodiment the quick-connect portion is configured to detach from the first tubing engagement portion to disassemble the tube coupling such that the quick-connect portion remains affixed to the second tubing engagement portion after disassembly.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the disclosure.

What is claimed is:

1. A tube fitting comprising:
a first fitting member having a cylindrical body including a flange, the flange continuously circumferentially extending around the cylindrical body;
a second fitting member having
a cylindrical body including a plurality of tines extending from the cylindrical body, the plurality of tines being configured to engage the flange where the plurality of tines and the flange are configured to secure the first and second fitting members to each other;
a tube engagement member having a tubing engagement portion and a sealing portion, and
a coupling member removably fastened to the sealing portion, where the plurality of tines extend from the coupling member and each tine includes a retaining surface and an engagement ramp both configured to engage the flange so that engagement of the engagement ramp with the flange radially spreads the tines for axial movement of the retaining surface past the flange, where the tube engagement member and the coupling member are configured to detach to disassemble the tube fitting and Where the engagement between the retaining surface of each tine and the flange prevents removal of the coupling member from the tube engagement member such that the coupling member remains affixed to the first fitting member upon detachment of the tube engagement member and the coupling member; and
at least one seal disposed between the first fitting member and the second fitting member.

2. The tube fitting of claim 1, wherein the coupling member is rotatable relative to the first fitting member.

3. The tube fitting of claim 1, wherein each of the tube engagement member and the coupling member include flats configured to interface with a tool for disassembly of the tube fitting.

4. The tube fitting of claim 1, wherein
the tube engagement member includes an internal passage having a sealing surface,
the first fitting member includes a mating sealing surface, and
the at least one seal is disposed between the sealing surface and the mating sealing surface.

5. The tube fitting of claim 4, wherein the at least one seal includes one or more of air elastomeric seal or a seal formed by interfacing of the sealing surface and the mating sealing surface.

6. The tube fitting of claim 1, wherein
the second fitting member includes an internal passage formed therethrough, and
the first fitting member includes a cylindrical body having an internal passage and being configured to be at least partially inserted into the internal passage of the second fitting member.

7. The tube fitting of claim 1, wherein engagement of the plurality of tines with the flange is configured to produce one or more of a tactile, aural and visual indication that a predetermined compressive force is applied to the at least one seal.

8. The tube fitting of claim 1, wherein
the flange includes a ramp surface and an engagement surface; and
where the ramp surface and the engagement ramp interface for assembly of the tube fitting and the engagement surface and the retaining surface interface to maintain a compressive force on the at least one seal.

9. The tube fitting of claim 8, wherein the engagement surface and the retaining surface are configured such that a portion of the second fitting member including the plurality of tines remains attached to the first fitting member upon disassembly of the tube fitting.

10. The tube fitting of claim 1, wherein the at least one seal is configured to maintain at least partial system pressure within an internal passage of the tribe fitting.

11. The tube fitting of claim 1, wherein the coupling member includes a threaded fastening portion configured to engage a corresponding threaded fastening portion of the sealing portion.

12. A tube fitting comprising:
a first fitting member having a cylindrical body including a tubing engagement portion, a sealing portion and a flange, the flange continuously circumferentially extending around the cylindrical body:
a second fitting member having a cylindrical body including a tubing engagement portion and a sealing portion;

a third fitting member including a base portion and a plurality of tines extending from the base portion, the base portion being configured to fasten to the sealing portion of the second fitting member and each tine of the plurality of tines includes a retaining surface and an engagement ramp both configured to engage the flange so that engagement of the engagement ramp with the flange radially spreads the tines for axial movement of the retaining surface past the flange, where the plurality of tines and the flange are configured to secure the second and third fitting members to the first fitting member, where the second and third fitting members are unfastened to disassemble the tube fitting and where the engagement between the retaining surface of each tine and the flange prevents removal of the third fitting member from the first fitting member such that the third fitting member remains affixed to the first fitting member upon disassembly of the second and third fitting members; and at least one seal disposed between the first fitting member and the second fitting member.

13. The tube fitting of claim 12, wherein the third fitting member is rotatable relative to the first fitting member.

14. The tube fitting of claim 12, wherein the at least one seal includes one or more of an elastomeric seal or a seal formed by interfacing of the sealing portion of the first fitting member and the sealing portion of the second fitting member.

15. The tube fitting of claim 12, wherein engagement of the plurality of tines with the flange is configured to produce one or more of a tactile, aural and visual indication that a predetermined compressive force is applied to the at least one seal.

16. The tube fitting of claim 12, wherein the base portion is configured to threadably fasten to the sealing portion of the second fitting member.

17. A method for connecting tubing, the method comprising:

aligning a first tubing engagement member with a tube fitting assembly, the tube fitting assembly having a second tubing engagement member and a coupling member affixed to the second tubing engagement member;

moving the first tubing engagement member and the tube fitting assembly, together; and engaging a plurality of tines extending from the coupling member with a flange on the first tubing engagement member to maintain a seal formed between the first and second tubing engagement members, where the flange continuously circumferentially extends around a cylindrical body of the first tubing engagement member, where each tine includes a retaining surface and an engagement ramp both configured to engage the flange so that engagement of the engagement ramp with the flange radially spreads the tines for axial movement of the retaining surface past the flange;

wherein the tube fitting assembly is disassembled by detaching the coupling member from the second tubing engagement member where engagement between the retaining surface of each of the plurality of tines and the flange prevents removal of the coupling member from the first tubing engagement member such that the coupling member remains affixed to the first tubing engagement member upon disassembly of the tube fitting assembly.

18. The method of claim 17, further comprising providing, with at least the plurality of tines, one or more of a tactile, aural and visual indication that a predetermined compressive force is applied to the seal upon engagement of the plurality of tines with the flange.

* * * * *